(12) United States Patent
Kielstra et al.

(10) Patent No.: US 7,913,240 B2
(45) Date of Patent: *Mar. 22, 2011

(54) METHOD AND APPARATUS FOR TRANSFORMING JAVA NATIVE INTERFACE FUNCTION CALLS INTO SIMPLER OPERATIONS DURING JUST-IN-TIME COMPILATION

(75) Inventors: Allan Henry Kielstra, Ajax (CA); Levon Sassoon Stepanian, Toronto (CA); Kevin Alexander Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/366,355

(22) Filed: Feb. 5, 2009

(65) Prior Publication Data

US 2009/0144710 A1  Jun. 4, 2009

Related U.S. Application Data

(63) Continuation of application No. 11/062,306, filed on Feb. 18, 2005, now Pat. No. 7,490,320.

(51) Int. Cl.
*G06F 9/45* (2006.01)
(52) U.S. Cl. .......................... 717/148; 717/147; 717/153
(58) Field of Classification Search .......... 717/134–148, 717/151–156
See application file for complete search history.

(56) References Cited

U.S. PATENT DOCUMENTS

| 6,066,181 | A | * | 5/2000 | DeMaster | 717/148 |
| 6,282,702 | B1 | * | 8/2001 | Ungar | 717/148 |
| 6,314,445 | B1 | * | 11/2001 | Poole | 718/1 |
| 6,467,079 | B1 | * | 10/2002 | Ettritch et al. | 717/108 |
| 7,089,566 | B1 | * | 8/2006 | Johnson | 719/328 |
| 7,171,655 | B2 | * | 1/2007 | Gordon et al. | 717/146 |
| 7,346,897 | B2 | * | 3/2008 | Vargas | 717/137 |
| 2004/0250240 | A1 | * | 12/2004 | Stoodley et al. | 717/116 |
| 2006/0190934 | A1 | | 8/2006 | Kielstra et al. | |

FOREIGN PATENT DOCUMENTS

JP  2003076558 A  3/2003
WO  9715006 A1  4/1997

OTHER PUBLICATIONS

Czajkowski et al., Multitasking without comprimise: a virtual machine evolution, ACM Portal, 2001, pp. 125-138.*

(Continued)

*Primary Examiner* — Wei Y Zhen
*Assistant Examiner* — Satish Rampuria
(74) *Attorney, Agent, or Firm* — Yee & Associates P.C.; Libby Z. Toub

(57) ABSTRACT

A method, apparatus, and computer instructions for transforming JAVA Native Interface function calls to constants, internal just-in-time (JIT) compiler operations or simpler intermediate representation. A compiler generates plurality of intermediate representations for a plurality of native interface function calls. During inlining of native code, matching is performed on each native function call (against this list) and a list of native interface function calls is generated. For each native interface function call, a (JIT) call transformer attempts to replace the native interface function call with a constant, internal JIT compiler operation or a simpler intermediate representation depending on the type of native interface function call.

23 Claims, 4 Drawing Sheets

OTHER PUBLICATIONS

White et al., Adapting Legacy Computational Software for XMSF, aquired from https://netlab.gmu.edu/XMSF/pubs/03F-SIW-112.pdf, 2003, pp. 1-9.*

Welsh et al., "Jaguar: Enabling Efficient Communication and I/O in Java", University of California, Berkley, CA, Dec. 1999, 14 pages.

"Native Inlining", 1 pg., uploaded May 21, 2004. http://www.str.com.au/jnibench/native_inlining.htm.

Kurzyniec et al., "Efficient Cooperation Between Java and Native Codes—JNI Performance Benchmark", Emory University, In Proceedings of the 2005 International Symposium on Code Generation and Optimization, Palo Alto, California, Mar. 20-24, 2005, pp. 75-86.

Bothner, "Java/C++ integration", Writing native Java methods in natural C++, Cygnus Solutions, Nov. 1997, 11 pages. http://gcc/gnu.org/java/papers/native++html.

Bacon, "JaLa A Java package for Linear Algebra", presented at the Computer Science Division, University of California, Berkley, 1998, IBM T.J. Watson Research Center, pp. 1-10.

Newmonics, Inc., "Best Practices for Native Code Integration with PERC®", Feb. 26, 2003, pp. 1-8. http://www.newmonics.com/perceval/whitepapers.shtml.

Veldema et al., "Jcc, a native Java compiler", Master's thesis, Department of Mathematice and Computer Science, Vrije Universiteit, The Netherlands, Jul. 31, 1998, pp. Cover p. 51.

Eckel, "Raw Native Interface (RNI)", 2004, 3 pages. http://www.codeguru.com/java/tij/tij0194.shtml.

"IBM Rewrites the Book on Java™ Performance", 17 pages, uploaded Jun. 21, 2000. http://www.developer.ibm.com/java/j2/j2perfpaper.html.

Triplett, "Evolving Performance of the Java Virtual Machine: A Timeline of Performance Improvements to the JVM", Dec. 1, 2001, pp. 1-4. http://www.-106.ibm.com/developerworks/java/library/j-berry/sidebar.html.

Intel Corp., "The Open Runtime Platform: A Flexible High-Performance Managed Runtime Environment—The Just-in-Time Compiler Interface—Native Method Support", Intel Technology Journal, vol. 7, Issue 1, Feb. 19, 2003, pp. 1-8. http://www.intel.com/technology/itj/2003volume07issue01/art01.

Liang, "The Java™Native Interface", Programmer's Guide and Specification, Addison-Wesley, Copyright © 1999 Sun Microsystems, Inc., pp. cover p. 303.

Mcghan et al., "PicoJava: A Direct Execution Engine for Java Bytecode", IEEE, vol. 31, Issue 10, Oct. 1998, pp. 22-30.

Cramer et al., "Compiling Java Just in Time", IEEE, vol. 17, Issue 3, 1997, pp. 36-43.

Yasue et al., "An Efficient Online Path Profiling Framework for Java Just-In-Time Compilers", IEEE, 2003, pp. 148-158.

* cited by examiner

METHOD AND APPARATUS FOR TRANSFORMING JAVA NATIVE INTERFACE FUNCTION CALLS INTO SIMPLER OPERATIONS DURING JUST-IN-TIME COMPILATION

CROSS-REFERENCE TO RELATED APPLICATION

The present invention is related to the following application entitled "Method and Apparatus for Inlining Native Functions into Compiled Java Code", Ser. No. 11/062,293, filed on Feb. 18, 2005.

This application is a continuation of application Ser. No. 11/062,306, filed Feb. 18, 2005, status allowed.

BACKGROUND OF THE INVENTION

1. Technical Field

The present invention relates to an improved data processing system. In particular, the present invention relates to Java™ native function calls in a data processing system. Still more particular, the present invention relates to transforming Java™ Native Interface function calls into constants, internal compiler operations or simpler operations in a data processing system.

2. Description of Related Art

In this disclosure, Java™ ("Java") and all Java-based marks, such a Java virtual machine, JVM™ ("JVM"), Java Native Interface, JNI™ ("JNI"), and Java Development Kit, JDK™ ("JDK"), are trademarks or registered trademarks of Sun Microsystems, Inc., or its subsidiaries in the United States and other countries.

Java is an object oriented programming language and environment focusing on defining data as objects and the methods that may be applied to those objects. Java supports only single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates Bytecode instructions that are non-specific to particular computer architectures. A Bytecode is a machine independent code generated by the Java compiler and executed by a Java interpreter. A Java interpreter is a module in the JVM that alternatively decodes and executes a Bytecode or Bytecodes. These Bytecode instructions are designed to be easy to interpret on any machine and easily translated on the fly into native machine code.

A development environment, such as the Java Development Kit (JDK) available from Sun Microsystems, Inc., may be used to build Java Bytecode from Java language source code and libraries. This Java Bytecode may be stored as a Java application or applet on a Web Server, where it can be downloaded over a network to a user's machine and executed on a local JVM.

The Java run-time environment is specifically designed to limit the harm that a Java application can cause to the system that it is running on. This is especially important with the World Wide Web, where Java applets are downloaded and executed automatically when a user visits a Web page that contains Java applets. Normally one would not want to execute random programs; they might contain viruses, or they might even be potentially malicious themselves and not merely carrying unwelcome code unintentionally. Unless the user specifically allows it (by setting the appropriate flags in the user-interface to the JVM), a Java applet cannot read or write to attached storage devices (except perhaps to a specific, restricted area), nor can it read or write to memory locations (except to a specific, restricted area).

Not only are Java applets designed for downloading over the network, standard Java libraries also specifically support client-server computing. The Java language includes provisions for multi-threading and for network communications. Compared to other languages (such as C), it is much easier to write a pair of programs, one executing locally on the user's computer that is handling the user-interaction, and the other executing remotely on a server, which is performing potentially more sophisticated and processor-intensive work.

While the Java language is designed to be platform-independent and to execute primarily in a secure environment, programmers can extend Java applications through the use of compiled native binary code on the host operating system using C-style calling conventions through the Java Native Interface (JNI). In this fashion, a Java application can have complete access to the host operating system, including reading and writing to attached I/O devices, memory, etc. Because of this, Java programs can accomplish tasks that are not normally allowed via the JVM at the cost of being platform-specific. However, with a well-designed architecture, a Java language programmer can cleanly isolate the platform-independent portion, and present a clean, platform-independent object API to other Java components while at the same time accomplishing platform-specific tasks.

With the JNI API, parameters and class data residing inside the Java Virtual Machine (JVM) as well as services provided by the JVM are accessible and may be modified. However, since JNI exposes a very platform independent and opaque representation of the JVM, its data and services, overheads exist. The JNI API is typically exposed by a pointer to a table of function pointers (referred to as the JNI environment pointer, or JNIEnv) to JNI function implementations. Although the pointer is essential to JNI's platform independence, the pointer may also be costly because additional branches and table lookups are performed during a JNI function call. The cost of a JNI invocation depends on the type of JNI function being called.

For example, to access string and array parameters passed from Java to native code, special invocations of JNI functions are required. These special invocations cause expensive runtime copy operations to avoid touching the JVM's copy of the data. The JNI API thus provides accessor functions that attempt to increase the chances of native code receiving direct references to underlying JVM data. However, these functions are implemented at the JVM's discretion and the use of these functions places certain restrictions on the programmer's freedom.

For field and method access, JNI function calls are also required to modify objects and access JVM services from the native code. For example, to modify an object's field or call a class's method, a handle to the appropriate data must first be retrieved. This retrieval is typically implemented as a traversal on the JVM's reflective data structures, in addition to expensive string-based signature comparison operations at runtime. This traversal is orders of magnitude slower than direct field accesses in Java. In addition, JNI function calls may stall if a non-asynchronous JVM is performing blocking work.

Other JNI functions have a unique set of overheads similar to JNI functions for field and method access. These JNI functions include functions that instantiate objects, manage references, handle exceptions, support synchronization and reflection, and ones that are in the Java invocation API for embedding JVMs inside native code.

Several attempts have been made to minimize the overhead of JNI function calls. The first of these attempts are programmer-based optimizations in the form of efficient coding techniques when writing native code that uses the JNI API. The JNI specification also provides a set of critical functions that may return direct references to JVM data and objects and suggests ways to avoid calling into JNI API, for example, caching field and method IDs during static initialization of classes.

Another attempt involves removing native function related overheads by minimizing dependencies on JNI API functions by restricting the type of functionality that can be offered in native code. However, this mechanism may only be used for methods that are guaranteed not to require garbage collection, exception handling, synchronization or any type of security support since these are the types of functionality the wrappers provide.

In yet another attempt to minimize the overhead of JNI function calls, compilers may use proprietary native interfaces that are tightly coupled to the VM, since the interfaces have knowledge of the internals of the VM. An example of such compilers is the Jcc compiler, which is an optimizing compiler that compiles directly to native code using a proprietary native interface reminiscent of the original Native Method Interface (NMI), from Sun Microsystems, Inc. However, the NMI has been replaced by the JNI. In Jcc, a Java method that is marked 'native' will be treated as a C method to be called with C calling conventions and emitting a C structure for every Java class. In this way, Jcc may inline short assembly segment to speed up native calls.

While the above attempts minimizes some of the overhead associated with JNI function calls, there is no existing mechanism that does not restrict the type of functionality implemented in native code, as mentioned in the second attempt, or does not couple to a specific VM implementation, as mentioned in the third attempt.

Therefore, it would be advantageous to have a method, an apparatus, and computer instructions for use by a Just in Time (JIT) compiler transforming JNI function calls to constants, internal compiler operations or a simpler intermediate representation, such that performance of native codes accessing JVM data and services may be improved without coupling to a specific VM implementation or sacrificing type safety of the JNI.

SUMMARY OF THE INVENTION

The present invention provides a method, an apparatus, and computer instructions for transforming native function calls into simpler operations during just-in-time compilation. After compiling a program to generate a list of shapes for a plurality of Java Native Interface (JNI) function calls, an inliner is provided to identify a list of native interface function or JNI calls made in native code for transformation.

The just-in-time (JIT) compiler then performs a definition and use (def/use) analysis on the list of native interface function calls and a plurality of arguments passed to the native interface function calls. Subsequently, a JIT call transformer is provided to transform a portion of the list of native interface function calls into constants, internal just-in-time compiler operations or simpler intermediate representation using results of the definition and use analysis.

During inlining of native functions calls, the just-in-time inliner determines, for each native interface call occurring in the inlined code, if the native interface environment variable used in the call is in the same position as it appears in a list of pre-defined shapes representing all known native interface calls. The shape of a JNI call includes (1) the means (represented in the intermediate representation) to access the actual target native interface or JNI function (2) the treatment (again in the intermediate representation) each actual argument receives. The shape of a representative JNI call (as created when building the list of shapes) uniquely determines the actual JNI routine. If the native interface environment variable used in a call is in the same position as in one of the shapes in the list of pre-defined shapes representing native interface calls, the inliner determines if a match exists between the shape and the intermediate representation of the JNI call made by an inlined native function.

If a match exists between the shape and the intermediate representation of the JNI function call, the inliner adds the JNI call to a list of JNI function calls for the currently inlined native method, wherein the list of calls is sorted in an order of appearance in the intermediate representation of the plurality of JNI calls.

After performing definition and use analysis, the just-in-time call transformer determines, for each native interface function call in the list of native interface function calls, the type of the native interface function calls, and attempts to replace each native interface function call with a constant value, internal just-in-time compiler operation or a simpler intermediate representation depending on the type of JNI function call.

Since the newly generated constants, internal just-in-time compiler operations or simpler intermediate representation perform without using the JNI, they in turn provide direct and faster access to the services and data of the Java virtual machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
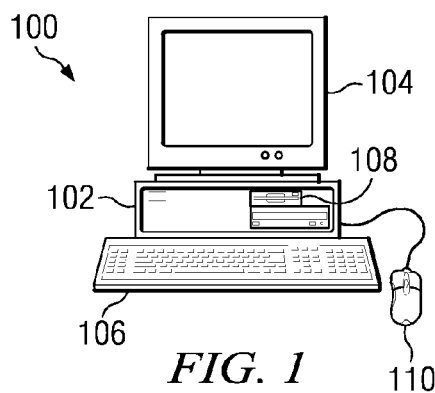
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an International Business Machines, IBM®, eServer computer or IntelliStation® computer, which are products of IBM® Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
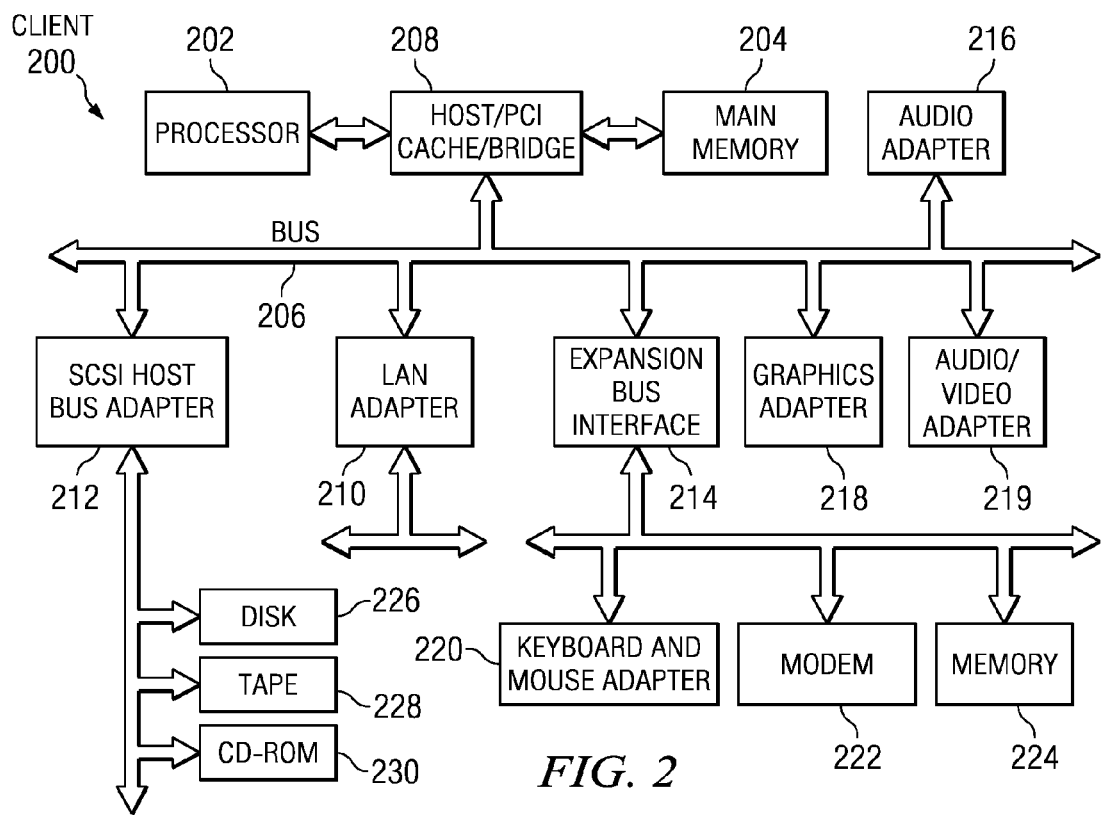
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on the data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
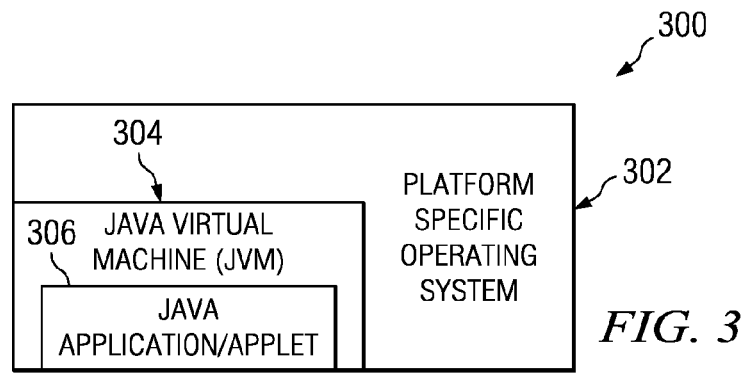
FIG. 3 is a block diagram illustrating the relationship of software components operating within a computer system that may implement the present invention.

With reference now to FIG. 3, a block diagram illustrating the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute a Java application or applet 306, which is a program, servlet, or software component written in the Java programming language. The computer system in which JVM 304 operates may be similar to data processing system 200 or computer 100 described above.

However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java Bytecodes and may use a range of techniques to execute the instructions represented by the Bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates Bytecode instructions that are nonspecific to a particular computer architecture. A Bytecode is a machine independent code generated by the Java compiler and executed by a Java interpreter. A Java interpreter is part of the JVM that alternately decodes and interprets a Bytecode or Bytecodes. These Bytecode instructions are designed to be easy to interpret on any computer and easily translated on the fly into native machine code. Bytecode may be translated into native code by a just-in-time compiler or JIT.

A JVM loads class files and executes the Bytecodes within them. The class files are loaded by a class loader in the JVM. The class loader loads class files from an application and the class files from the Java application programming interfaces (APIs) which are needed by the application. The execution engine that executes the Bytecodes may vary across platforms and implementations.

One type of software-based execution engine is a just-in-time (JIT) compiler. With this type of execution, the Bytecodes of a method are compiled to native machine code upon successful fulfillment of criteria for JIT compiling a method. The native machine code for the method is then cached and reused upon the next invocation of the method. The execution engine may also be implemented in hardware and embedded on a chip so that the Java Bytecodes are executed natively. JVMs usually interpret Bytecodes, but JVMs may also use other techniques, such as just-in-time compiling, to execute Bytecodes.

When an application is executed on a JVM that is implemented in software on a platform-specific operating system, a Java application may interact with the host operating system by invoking native methods. A Java method is written in the Java language, compiled to Bytecodes, and stored in class files. A native method is written in some other language and compiled to the native machine code of a particular processor. Native methods are stored in a dynamically linked library whose exact form is platform specific.

Figure 4:
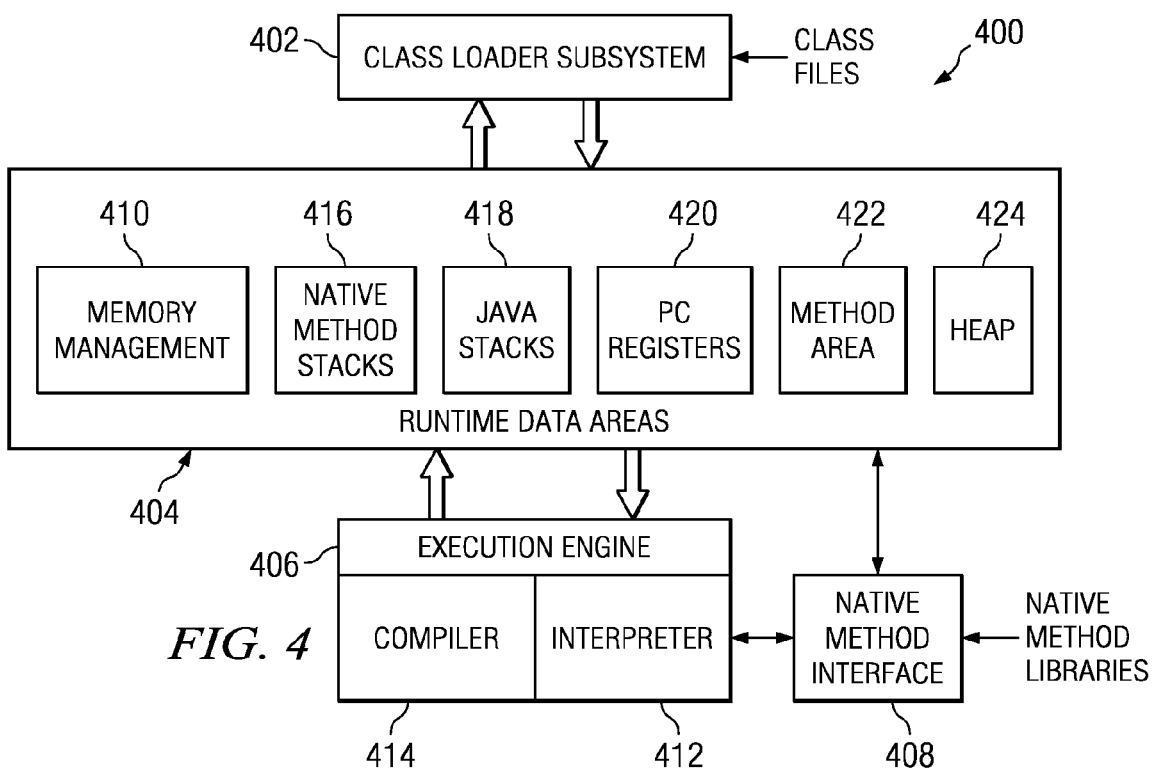
FIG. 4 is a block diagram of a JVM in accordance with a preferred embodiment of the present invention.

With reference now to FIG. 4, a block diagram of a JVM is depicted in accordance with a preferred embodiment of the present invention. JVM 400 includes class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 are used to indicate the next instruction to be executed. Each instantiated thread gets its own PC register and Java stack. If the thread is executing a JVM method, the value of the PC register indicates the next instruction to execute. Native method stacks 416 stores the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which are shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The present invention provides a method, an apparatus, and computer instructions during JIT compilation for transforming JNI function calls into simpler compiler operations which ultimately results in the generation of constants and more efficient intermediate representation. In a preferred embodiment, the present invention utilizes a JIT compiler intermediate representation that is converted from an inlined native function intermediate representation. The present invention provides a JNI call transformer that performs analysis on each generated JIT compiler intermediate representation instruction searching for JNI function calls. The JNI call transformer then transforms as many JNI function call's intermediate representations into internal JIT compiler operations or constants in order to generate simpler operations that are equivalent to JNI calls but do not require calling the JNI function. In this way, faster access to JVM services and data is provided.

To discover the actual JNI methods that the program intends to invoke, the JNI call transformer first has to understand the shape of the JIT compiler intermediate representation for each JNI function call. In order to understand each shape, the JIT compiler is called by the JNI call transformer to compile non-executable C or C++ programs which call each JNI function in turn. The JNI call transformer gains knowledge of how each JNI function uses the JNIEnv argument and the use of each user provided arguments to each call, and maintains a list of known shapes. Alternatively, the JIT call transformer may determine the shapes dynamically at the start of Java program execution or as part of the JIT compiler build process. Alternatively, knowledge of the shapes may be hardcoded into the source code of the JIT compiler.

The shape of a JNI call includes (1) the means (represented in the intermediate representation) to access the actual target JNI function (2) the treatment (again in the intermediate representation) each actual argument receives. The shape of a representative JNI call (as created when building the list of shapes) uniquely determines the actual JNI routine. The process of building the list of shapes (by processing the special C and C++ programs) occurs, in the preferred embodiment when the Java process (and hence the JIT) begins execution. It is also possible to create the list of shapes when the JIT itself is constructed. By performing shape determination as part of the building the JIT compiler, a certain set of shapes is determined when the compiler is restarted. Thus, the shape for each JNI function could be statically encoded in the JIT compiler. The only requirement for performing shape determination as part of building the JIT compiler is that the intermediate representation used is correct for both the current version of the JIT compiler and the virtual machine. As a result of this process, a list of JNI function call intermediate representation shapes is generated.

Once shapes are determined, they will be used by the inliner as mentioned in related patent application entitled "METHOD AND APPARATUS FOR INLINING NATIVE FUNCTIONS IN COMPILED JAVA CODE," which is incorporated by reference above. Specifically, the related patent application provides a conversion engine to convert native function intermediate representation to JIT compiler intermediate representation, as well as an inliner which replaces the intermediate representation of an inlineable native function call with the actual implementation of the function in the JIT compiler intermediate representation. The inliner also performs inlining work including mapping parameters to arguments, merging native compiler and JIT compiler intermediate representations, control flow graphs, and materializing the JNIEnv pointer so that it can be used by an inlined statement to make calls to the JNI API.

During the inlining of native code, the inliner analyzes inlined code for intermediate representation statements generated representing JNI calls. It does so by matching inlined intermediate representation against the list of shapes generated from C or C++ programs, or during the JIT build process. The inliner records all the uses of the JNIEnv variable in the inlined native function, which may be passed to recursively inlined functions. When the inliner encounters a use of the JNIEnv variable, if the JNIEnv variable is not used in the same position as it appears in any of the list of shapes, the inlining process continues. However, if the JNIEnv variable is used in the same position as it appears in one of the list of shapes, the entire shape is matched to the intermediate representation for the JNI function callsite. A shape (of a JNI method call) matches a member of the list of shapes if it has the same number of arguments and each argument in the actual call is compatible with the type of argument in the member of the list of shapes. If a match is found, meaning that the callsite corresponds to a JNI function call, the callsite is not eligible for inlining, but may be eligible for transformation.

In this case, the JIT compiler inliner records the callsite that it determines to correspond to a JNI function call. A list of such JNI function calls is generated, which is sorted in the order of appearance in the intermediate representation for the inlined method. If one method call uses results of another method call, the inner most method call will appear in the list before the use of the result. Once the analysis of callsites is complete, a list of JNI function calls that are non-inlineable but potentially transformable is identified by the inliner. The JNI call transformer then performs transformations on the list of JNI function calls using results of a JNI def/use analysis.

A number of JNI function calls are used to identify elements that are normally identified via the class' constant pool. Examples of these JNI function calls include getObjectClass, getMethodID, and getFieldID. Other JNI function calls may perform more concrete actions, such as getting or setting object field values. However, it is necessary to know the specific types of objects that are passed to the JNI function before optimization can be performed. Therefore, a JNI def/use analysis is performed.

The JNI def/use analysis, which is similar to a well understood definition/use analysis commonly used in optimizing compilers, is performed by tracking objects that are passed to the inlined native method through the inlined code to the points where they are passed as arguments to JNI functions. Each argument is represented by a set of possible objects depending on the flow of control from the start of the inlined native method to the invocation of the JNI function. This set of objects may include more than one element and the elements may all come from the same class.

The def/use analysis computes all possible classes, fields and methods reaching uses in JNI function calls. That is, when it cannot conclusively determine, for example, the class that an object must be an instance of at a JNI callback, it produces sufficient information to allow the transformation phase to consider all possible classes that the object may be an instance of.

It is possible that the def/use analysis is unable to compute even conditional results. This would arise, for example if arguments to a JNI function call are fetched from storage (having been written there by a previous process) for use in a subsequent JNI function call.

In the JNI def/use analysis, the results of getObjectClass, getSuperClass, findClass, getMethodID and getFieldID are treated as definitions and their uses are tracked. The result can normally be transformed into constant values that will be used instead of the usual constant pool indices.

In addition, the JNI def/use analysis also tracks the string arguments to findClass, getMethodID, and getFieldID. In this way, the JIT compiler may positively resolve some of these calls while a more naïve implementation would be unable to. However, one complication with JNI def/use analysis is that the results of NewObjectType JNI calls can reach various uses of objects in the list of JNI function calls. Thus, these results have an abstract type that may become concrete if the class and methodIDs used as arguments to NewObjectType become fixed during the JNI def/use phase.

As mentioned above, the JNI call transformer performs transformation on the list of JNI function calls using results of a JNI def/use analysis. During transformation, the JNI call transformer iterates over the list of JNI function calls and replaces the JNI function call with a constant value or generation of new JIT compiler intermediate representation that is simpler and replaces the JNI function call with the new JIT compiler intermediate representation.

Depending on the type of JNI function calls, the possible outcome of the transformation may be different. For example, if all the possible definitions reaching a getObjectClass are of the same class, the call is replaced by the appropriate constant. As noted below, in the case where the def/use analysis produced known results including information about multiple, incompatible classes (of objects) reaching the getObjectClass, conditional logic and code replication are used to make the correct actual class available to subsequent uses.

If all possible classes reaching a getFieldID or getMethodID are compatible (in the Java sense) and the string arguments can be uniquely determined, the call is replaced by the appropriate constant. (If objects of incompatible classes reach the getFieldID or getMethodID, conditional logic may be inserted as described below.)

If all possible fieldIDs reaching a get<type>Field method or put<type>Field method, which retrieves or stores into a field of a Java class, are the same and all possible objects reaching the call are of compatible class types, the call is replaced by a corresponding sequence of the JIT compiler's intermediate representation. Note that this form of internal representation defers throwing of any exceptions in accordance with the Java rules for executing native methods. (The notation get<type>Field refers to any of the JNI API functions intended to retrieve a field from an object and similarly for other uses of the <type>notation. Those familiar with the JNI API will easily understand this notation).

Similar transformations are performed for the various call<type>Method JNI function calls in the list of JNI functions by removing the intermediate representation of the method being called and generating JIT intermediate representation that calls the function directly. For any of the entries in the list of JNI functions that are not handled using the steps above, the call is treated as an ordinary call to an appropriate VM service routine.

It is important to note, that for any of the abovementioned functions, if the JNI def/use phase produced known but not conclusive information, conditional logic based on the type of actual receiver objects or the actual values passed into the JNI function calls (i.e. jfieldID or jmethodID) is inserted along with the appropriate intermediate-representation to represent the semantics of the specific JNI function being transformed.

Figure 5:
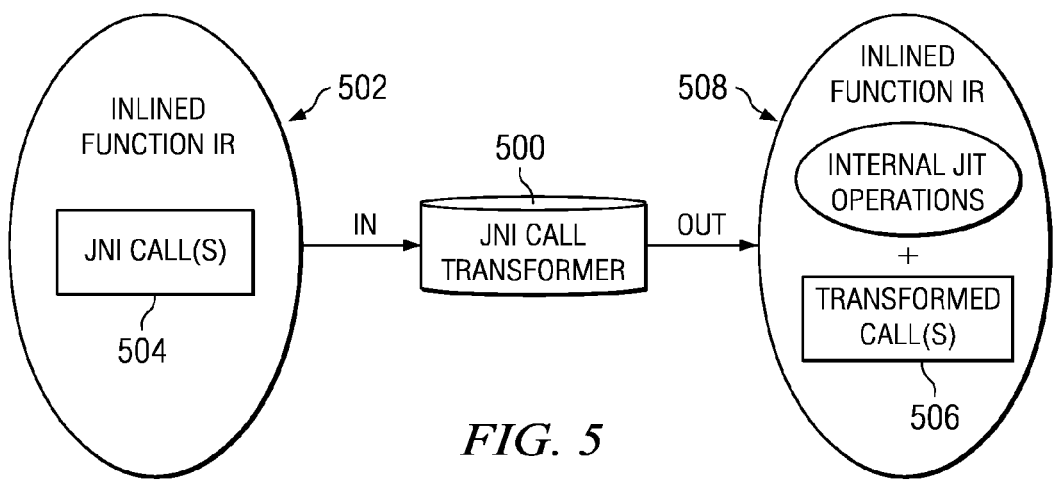
FIG. 5 is a diagram illustrating JNI function call transformation performed by the JNI call transformer in accordance with a preferred embodiment of the present invention.

Turning now to FIG. 5, a diagram illustrating JNI function call transformations performed by the JNI call transformer is depicted in accordance with a preferred embodiment of the present invention. As shown in FIG. 5, JNI call transformer 500 is provided by the present invention.

JNI call transformer 500 iterates over each JIT compiler intermediate representation instruction 502 that is inlined by an inliner provided by the related patent application. Some of JIT compiler intermediate representation instructions 502 may be JNI function calls 504, which utilize the JNI API functions.

For those instructions that are JNI function calls, JNI call transformer 500 transforms the instructions into transformed calls 506 and internal JIT compiler operations 508. Transformed calls 506 may be simpler JIT compiler intermediate representation that provides more direct and faster access to the JVM services and data. Internal JIT compiler operations 508 may be constant values or simplified intermediate representation that does not use the JNI.

In this way, JNI call transformer 500 modifies some or many JNI function calls to remove the need to actually call the JNI function. The transformation is performed by an analysis using the inliner, matching the shape of JIT compiler intermediate representation for each JNI function against a list of known shapes. To perform this matching, a list of shapes is first generated in a manner as described below in FIG. 6.

Figure 6:
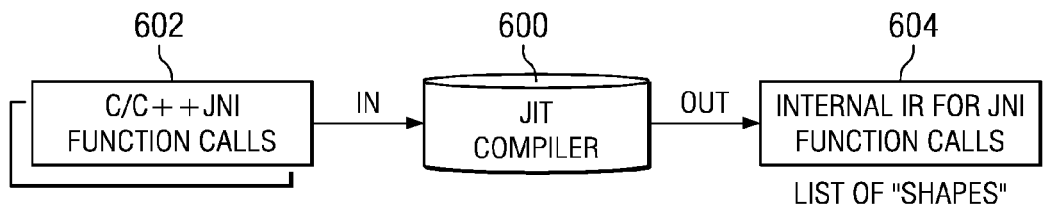
FIG. 6 is a diagram illustrating generation of intermediate representation for JNI function calls in accordance with a preferred embodiment of the present invention.

Turning now to FIG. 6, a diagram illustrating generation of intermediate representation shapes for JNI function calls is depicted in accordance with a preferred embodiment of the present invention. As shown in FIG. 6, JIT compiler 600 compiles non-executable C and C++ programs containing representative calls to all JNI functions 602 and generates a list of shapes 604 representing intermediate representation for JNI function calls.

Figure 7:
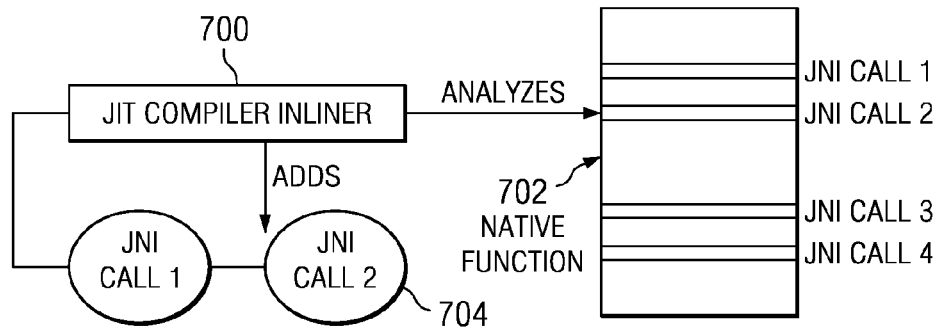
FIG. 7 is a diagram illustrating native inlining preparation for JNI transformation in accordance with a preferred embodiment of the present invention.

Turning now to FIG. 7, a diagram illustrating native inlining preparation for JNI transformation is depicted in accordance with a preferred embodiment of the present invention.

As depicted in FIG. 7, JIT compiler inliner 700 may be provided by the related patent application, which inlines native functions by replacing the intermediate representation for the native call with the actual implementation of the function in the JIT compiler intermediate representation format.

During inlining, JIT compiler inliner 700 may analyze native function intermediate representation 702 that includes a number of JNI function calls. In this example, native function intermediate representation 702 includes JNI call 1, JNI call 2, JNI call 3, and JNI call 4. For each of the JNI function calls matched by the JIT compiler inliner, the JIT compiler inliner 700 adds the JNI function call to the list of JNI function calls 704 in order of appearance in the intermediate representation of the inlined native function 702.

Thus, JNI call 1 is added to the list of JNI function calls 704 followed by JNI call 2. If one JNI function call uses the result of another JNI function call, the inner most call will appear first in the list.

Figure 8:
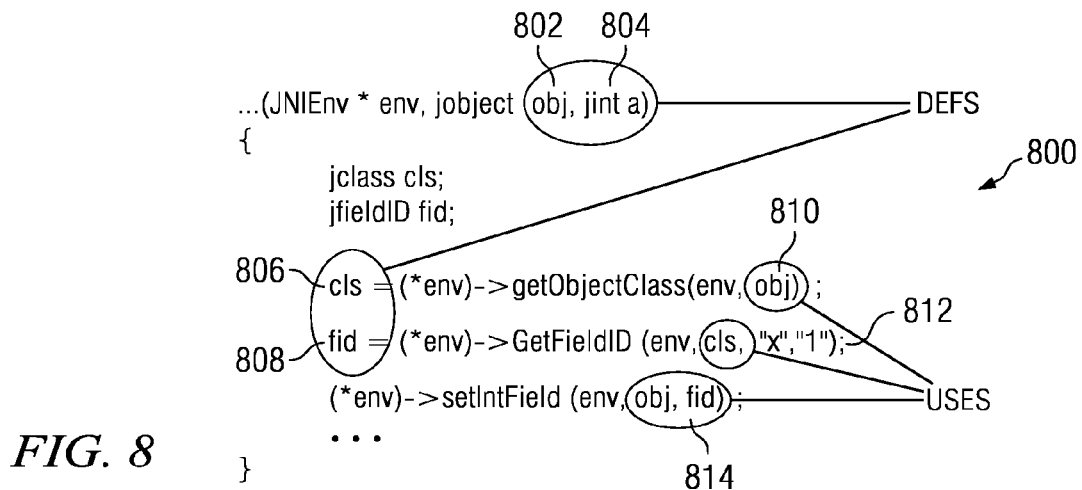
FIG. 8 is a diagram illustrating an exemplary def/use analysis performed by the compiler in accordance with a preferred embodiment of the present invention.

Turning now to FIG. 8, a diagram illustrating an exemplary def/use analysis performed by the compiler is depicted in accordance with a preferred embodiment of the present invention. As shown in FIG. 8, in JNI def/use analysis, the compiler analyzes the program and determines if further optimizations can be performed.

In this example, def/use analysis determines what variables are defined. For example, program 800 includes definitions object 'obj' 802, integer 'a' 804, class 'cls' 806 and field 'fid' 808. In addition, def/use analysis determines where the defined variables are being used. For example, 'obj' is used in getObjectClass method 810 and setIntField method 814, 'cls' is used in getFieldID method 812, and 'fid' is used in setIntField method 814. Since 'cls' 806 is a result of getObjectClass method 810, it is treated as a definition and its uses are tracked. In the code presented by this figure, it is possible to replace the JNI function call to GetFieldID with a constant value representing the field's ID. Furthermore, since 'fid' 808 is also an input argument to the setIntField method 814, it will be possible to transform the intermediate representation for the call to the setIntField method 814 to an intermediate representation that modifies the respective field in the object directly (i.e. without having to make a JNI function call to do so).

Figure 9:
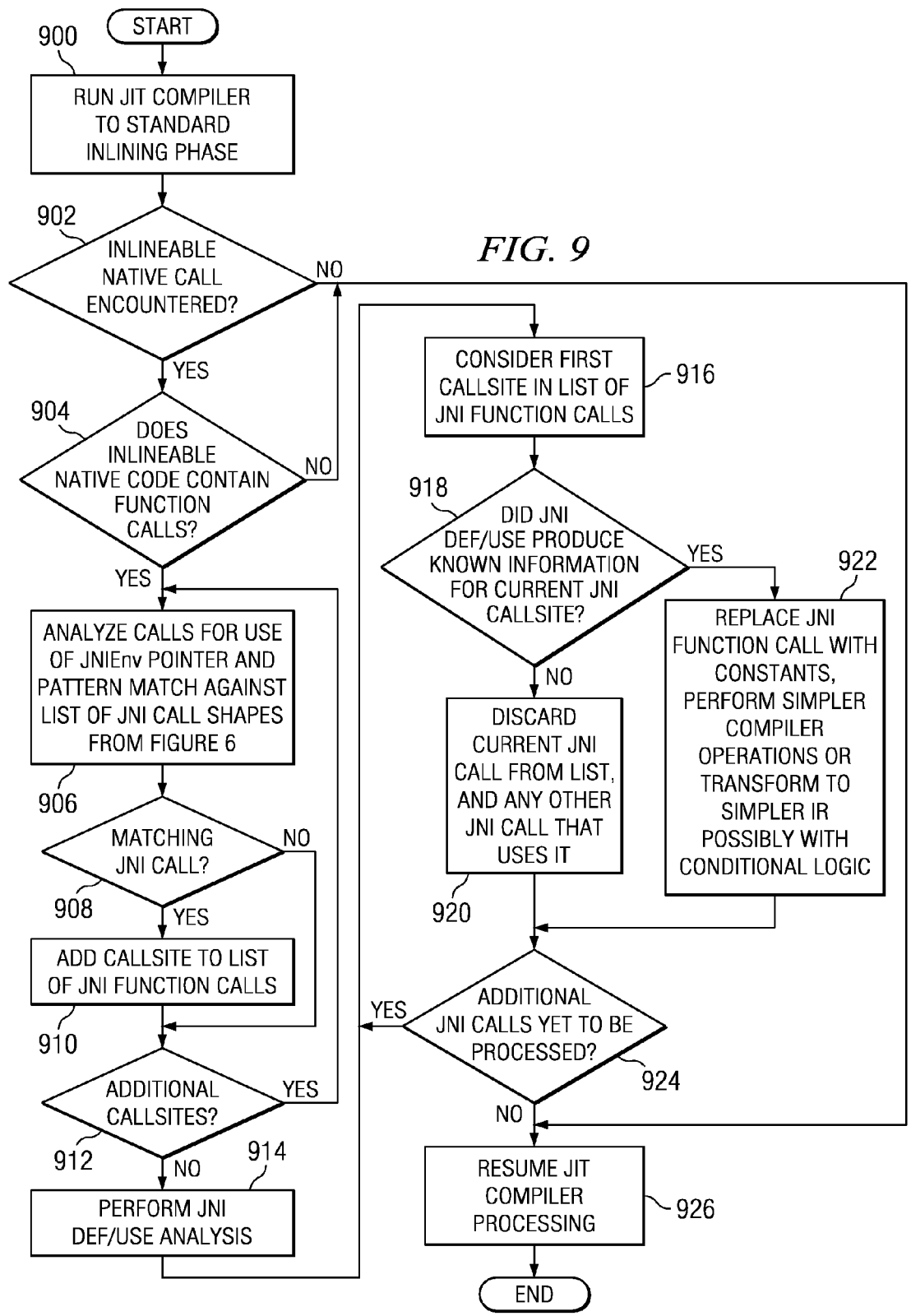
FIG. 9 is a flowchart of an exemplary process for transforming JNI function calls to constants, internal compiler operations or simpler intermediate representation in accordance with a preferred embodiment of the present invention.

Turning now to FIG. 9, a flowchart of an exemplary process for transforming JNI function calls to constants, internal compiler operations or simpler intermediate representation is depicted in accordance with a preferred embodiment of the present invention. The process assumes that the JNI call transformer has run the JIT compiler to generate JIT compiler intermediate representation and a list of JNI function call shapes, as depicted in FIG. 6.

As depicted in FIG. 9, the inliner is run to its standard inlining phase (step 900). It checks to see if it encounters any inlineable native callsites (step 902). If it doesn't, it continues to step 926 which resumes the rest of JIT compilation. If a native callsite, however, is encountered, it continues to step 904, at which point it checks whether an inlineable native function contains any function calls. If it doesn't, then the inliner proceeds to step 926 which resumes the rest of JIT compilation. If the inlineable native call does contain function calls, then the process continues to step 906 at which point the native code is matched against the JNI function call shapes that were generated by the process depicted in FIG. 6. In step 908, a callsite is checked for a match, and if a match is found, step 910 adds the callsite to a list of JNI calls and proceeds to step 912 which repeats this last process for any additional callsites. If a callsite doesn't match, the process repeats itself until all callsites have been examined.

Once all callsites have been analyzed, step 914 performs the JNI def/use analysis, and continues by processing the first identified JNI call in step 916. If JNI def/use analysis produced a conclusive result for the callsite (step 918), then the intermediate representation for the call is replaced by a constant, simpler compiler operations or simpler intermediate representation, possibly with conditional logic for known results (step 922). If JNI def/use produced unknown results for this particular callsite, then the callsite and any others that use its result are discarded from the list of JNI function calls (step 920).

Once the results of JNI def/use have been used to transform the callsite, the process checks for additional JNI callsites (step 924). If there are more JNI callsites, the process continues to step 916. If there are no more callsites to process, step 926 continues with the rest of JIT compilation and the process terminates thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiment is directed towards processing Bytecodes in Java, the processes of the present invention may be applied to other programming languages and environments that process instructions, which are nonspecific to a computer on which the instructions are to be executed. In such a case, a virtual machine on the computer may interpret the instructions or send the instructions to a compiler to generate code suitable for execution by the computer on which the virtual machine is located.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transforming native interface function calls into simpler operations during just-in-time compilation, the method comprising:

constructing a list of shapes rendered in an intermediate language of a just-in-time compiler and representing a plurality of native interface function calls;

identifying a list of native interface function calls for possible transformation by matching the plurality of native interface function calls made in the native language program against the list of shapes;

performing a definition and use analysis on each of the list of identified native interface function calls by tracking a plurality of values passed as parameters to a plurality of arguments of native interface functions; and transforming a portion of the list of native interface function calls into one of a constant, an internal just-in-time compiler operation, and a simpler intermediate representation using results of the definition and use analysis.

2. The method of claim 1, wherein the list of shapes comprises intermediate representation of the plurality of native interface function calls and includes usage of a native interface environment variable and user arguments by the plurality of native functions calls.

3. The method of claim 2, wherein identifying step is performed during inlining of native function calls, responsive to detecting a native interface function call in an inlined native function call, and wherein the identifying step further comprises:

determining, for each of the list of identified native interface function calls, if the native interface environment variable is used in a same manner as in a shape in the list of generated shapes;

if the native interface environment variable is used in the same manner as in a shape in the list of constructed shapes, determining if a match exists between the shape and an intermediate representation of the native interface function call, wherein a match exists if the intermediate representation of the native interface function call has a same number of arguments and each argument in the native interface function call is compatible with a type of argument in the shape; and if a match exists between the shape and the intermediate representation of the native interface function call, adding the native interface function call to the list of native interface function calls, wherein the list of native interface function calls is sorted in an order of appearance in the intermediate representation of the plurality of native interface function calls.

4. The method of claim 3, wherein the definition and use analysis includes tracking a plurality of objects passed to the list of native interface function calls to point where the plurality of objects are passed as arguments to a native interface function after the list of native interface function calls is identified.

5. The method of claim 4, wherein the transforming step comprising:
for each native interface function call in the list of native interface function calls, determining if the definition and use analysis returns conclusive result;
if the definition and use analysis returns conclusive result, determining a type of the native interface function call; and
replacing the native interface function call with one of a constant value, an internal just-in-time compiler operation, and a simpler intermediate representation depending on the type of native interface function call.

6. The method of claim 5, further comprising:
if the definition and use analysis returns a known result, replacing the callsite with intermediate representation containing conditional logic, representing the semantics of the specified call;
if the definition and use analysis returns an unknown result, discarding the native interface function call and any other native interface function call that uses the native interface function call from the list of native interface calls under consideration.

7. The method of claim 5, wherein the constants, internal just-in-time compiler operations and simpler intermediate representation provide direct and faster access to services and data of a virtual machine, wherein the internal just-in-time compiler operation performs its function without using the native interface.

8. The method of claim 1, wherein a shape in the list of shapes includes means represented in intermediate representation for accessing an actual target native interface function and treatment represented in intermediate representation each actual argument receives, and wherein the shape uniquely identifies the actual target native interface function.

9. The method of claim 1, wherein the definition and use analysis determines what variables are defined and where the defined variables are used.

10. A data processing system for transforming native interface function calls into simpler operations during just-in-time compilation, the data processing system comprising:
a processor and a memory communicatively coupled to the processor, the memory storing instructions comprising:
a just-in-time compiler for constructing a list of shapes rendered in an intermediate language of a just-in-time compiler for a plurality of native interface function calls;
a just-in-time compiler inliner for identifying, from the list of shapes, a list of native interface function calls for possible transformation;
wherein the just-in-time compiler performs a definition and use analysis on the list of native interface function calls and a plurality of arguments passed to the native interface functions, wherein the definition and use analysis determines what variables are defined and where the defined variables are used; and
a just-in-time call transformer for transforming a portion of the list of native interface function calls into one of a constant, an internal just-in-time compiler operation and a simpler intermediate representation using results of the definition and use analysis.

11. The data processing system of claim 10, wherein the list of shape comprises intermediate representation of the plurality of native interface function calls and includes usage of a native interface environment variable and user arguments by the plurality of native functions calls.

12. The data processing system of claim 11, wherein the just-in-time compiler inliner identifies the list of native interface function calls for transformation during inlining of native function calls, responsive to detecting a native interface function call in an inlined native function call, and wherein the just-in-time compiler inliner further:
determines, for each of the list of identified native interface function calls, if the native interface environment variable is used in a same manner as in a shape in the list of constructed shapes;
if the native interface environment variable is used in the same manner as in a shape in the list of generated shapes, determines if a match exists between the shape and an intermediate representation of the native function call, wherein a match exists if the intermediate representation of the native interface function call has a same number of arguments and each argument in the native interface function call is compatible with a type of argument in the shape; and
if a match exists between the shape and the intermediate representation of the native interface function call, adds the native interface function call to the list of native interface function calls, wherein the list of native interface function calls is sorted in an order of appearance in the intermediate representation of the plurality of native interface function calls.

13. The data processing system of claim 12, wherein the just-in-time compiler tracks a plurality of objects passed to the list of native interface function calls to point where the plurality of objects are passed as arguments to a native interface function after the list of native interface function calls is identified.

14. The data processing system of claim 13, wherein the just-in-time call transformer further:
for each native interface function call in the list of native interface function calls, determines if the definition and use analysis returns a known result;
if the definition and use analysis returns a known result, determines a type of the native interface function call; and
replaces the native interface function call with one of a constant value, an internal just-in-time compiler operation, and a simpler intermediate representation depending on the type of native interface function call.

15. The data processing system of claim 14, wherein the just-in-time transformer further:
discards the native interface function call and any other native interface function call that uses the native interface function call from the list of native interface calls, if the definition and use analysis returns an unknown result.

16. The data processing system of claim 14, wherein the internal just-in-time compiler operation provides direct and faster access to services and data of a virtual machine, wherein the internal just-in-time compiler operation performs its function without using the native interface.

17. A computer program product in a computer recordable medium for transforming native interface function calls into simpler operations during just-in-time compilation, the computer program product comprising:
first instructions for constructing a list of intermediate representation shapes representing a plurality of native interface function calls;
second instructions for identifying a list of native interface function calls for possible transformation by matching the plurality of native interface function calls made in the native language program against the list of shapes;

third instructions for performing a definition and use analysis on each of the list of identified native interface function calls by tracking a plurality of values passed as parameters to a plurality of arguments of native interface functions, wherein the definition and use analysis determines what variables are defined and where the defined variables are used; and fourth instructions for transforming a portion of the list of native interface function calls into one of a constant, an internal just-in-time compiler operations and a simpler intermediate representation using results of the definition and use analysis.

18. The computer program product of claim 17, wherein the list of shape comprises intermediate representation of the plurality of native interface function calls and includes usage of a native interface environment variable and user arguments by the plurality of native interface functions calls.

19. The computer program product of claim 18, wherein second instructions is performed during inlining of native functions calls, responsive to detecting a native interface function call in an inlined native function call, and wherein the second instructions further comprise:

first sub-instructions for determining, for each of the list of identified native interface function calls, if the native interface environment variable is used in a same manner as in a shape in the list of constructed shapes;

second sub-instructions for determining if a match exists between the shape and an intermediate representation of the native function call, if the native interface environment variable is used in the same manner as in a shape in the list of generated shapes wherein a match exists if the intermediate representation of the native interface function call has a same number of arguments and each argument in the native interface function call is compatible with a type of argument in the shape; and third sub-instruction for adding the native interface function call to the list of native interface function calls, if a match exists between the shape and the intermediate representation of the native interface function call, wherein the list of native interface function calls is sorted in an order of appearance in the intermediate representation of the plurality of native interface function calls.

20. The computer program product of claim 19, wherein the third instructions include first sub-instructions for tracking a plurality of objects passed to the list of native interface function calls to point where the plurality of objects are passed as arguments to a native interface function after the list of native interface function calls is identified.

21. The computer program product of claim 20, wherein the fourth instructions comprising:

first sub-instructions for determining if the definition and use analysis returns a known result for each native interface function call in the list of native interface function calls;

second sub-instructions for determining a type of the native interface function call if the definition and use analysis returns a known result; and third sub-instructions for replacing the native interface function call with one of a constant value, an internal just-in-time compiler operation, and a simpler intermediate representation depending on the type of native interface function call.

22. The computer program product of claim 21, further comprising:

fourth instructions for discarding the native interface function call and any other native interface function call that uses the native interface function call from the list of native interface calls, if the definition and use analysis returns an unknown result.

23. The computer program product of claim 21, wherein the internal just-in-time compiler operation provides direct and faster access to services and data of a virtual machine, wherein the internal just-in-time compiler operation comprises sub-instructions for performing its function without using a native interface.

* * * * *